United States Patent
Baron et al.

(10) Patent No.: US 9,794,886 B2
(45) Date of Patent: Oct. 17, 2017

(54) WIRELESS RADIOS MANAGED BASED ON PROXIMITY

(71) Applicant: Microsoft Technology Licensing, LLC, Redmond, WA (US)

(72) Inventors: Andrew Thomas Baron, Redmond, WA (US); Eliot John Flannery, Seattle, WA (US); Noel Anderson, Redmond, WA (US); Mitesh K. Desai, Sammamish, WA (US); Gianluigi Nusca, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 14/479,954

(22) Filed: Sep. 8, 2014

(65) Prior Publication Data

US 2016/0073352 A1 Mar. 10, 2016

(51) Int. Cl.
*H04W 52/02* (2009.01)
*H04W 88/10* (2009.01)
(Continued)

(52) U.S. Cl.
CPC ........ *H04W 52/0274* (2013.01); *H04B 17/27* (2015.01); *H04B 17/318* (2015.01);
(Continued)

(58) Field of Classification Search
CPC ..... H04W 4/008; H04W 4/04; H04W 52/245; H04W 52/283; H04W 88/10; Y02B 60/50
See application file for complete search history.

(56) References Cited

U.S. PATENT DOCUMENTS 7,171,216 B1   1/2007 Choksi
7,466,986 B2   12/2008 Halcrow et al.
(Continued)

OTHER PUBLICATIONS

Henry, "Smart WiFi Toggler for Android Learns Where Your Networks Are, Toggles Wi-Fi and Data Automatically", Retrieved From: <http://lifehacker.com/5963802/smart-wifi-toggler-for-android-learns-where-your-networks-are-toggles-wi-fi-and-data-automatically> Aug. 22, 2014, Nov. 28, 2012, 6 Pages.
(Continued)

*Primary Examiner* — Melvin Marcelo

(57) ABSTRACT

In embodiments of wireless radios managed based on proximity, a mobile device, such as a mobile phone, tablet computer, or other portable device can be implemented for multiple, different wireless communications. A mobile device can include a first radio system for a first wireless communications technology, and a second radio system for a second wireless communications technology. A connection manager determines, based on the first wireless communications technology, whether the mobile device is in an area that is proximate an endpoint implemented for the second wireless communications technology. The connection manager can turn-on the second radio system to enable wireless communication with the endpoint when the mobile device is in the area proximate the endpoint. Alternatively, the connection manager can turn-off the second radio system and conserve power that would otherwise be utilized to scan for the endpoint when the mobile device is not in the area proximate the endpoint.

20 Claims, 5 Drawing Sheets

(51) Int. Cl.
  *H04W 4/00* (2009.01)
  *H04W 4/02* (2009.01)
  *H04W 52/24* (2009.01)
  *H04W 52/28* (2009.01)
  *H04B 17/27* (2015.01)
  *H04B 17/318* (2015.01)

(52) U.S. Cl.
  CPC ........... *H04W 4/008* (2013.01); *H04W 4/021* (2013.01); *H04W 4/023* (2013.01); *H04W 52/0225* (2013.01); *H04W 52/0254* (2013.01); *H04W 52/245* (2013.01); *H04W 52/283* (2013.01); *H04W 88/10* (2013.01); *Y02B 60/50* (2013.01)

(56) References Cited

U.S. PATENT DOCUMENTS

| | | | |
|---|---|---|---|
| 7,929,964 | B2 | 4/2011 | Arumi et al. |
| 2010/0172274 | A1 | 7/2010 | Wu et al. |
| 2010/0195632 | A1 | 8/2010 | Prabhu |
| 2010/0329181 | A1 | 12/2010 | Lan |
| 2013/0310075 | A1* | 11/2013 | Lim ...................... H04W 4/025 455/456.2 |
| 2013/0331118 | A1 | 12/2013 | Chhabra et al. |
| 2013/0344810 | A1 | 12/2013 | Kasher et al. |
| 2014/0073246 | A1 | 3/2014 | Sip |
| 2014/0154984 | A1 | 6/2014 | Perrin et al. |
| 2014/0232618 | A1 | 8/2014 | Perrin et al. |
| 2015/0350334 | A1* | 12/2015 | Liu ...................... H04L 67/141 709/227 |

OTHER PUBLICATIONS

Singh, et al., "Green Operation of Multi-Band Wireless LAN in 60 GHz and 2.4/5 GHz", In Proceedings: 8th Annual IEEE Consumer Communications and Networking Conference—Wireless Consumer Communication and Networking, Jan. 9, 2011, 6 Pages.

"International Search Report and Written Opinion", Application No. PCT/US2015/048743, Nov. 4, 2015, 13 Pages.

"International Preliminary Report on Patentability Issued in PCT Application No. PCT/US2015/048743", Mailed Date: Jul. 29, 2016, 8 Pages.

* cited by examiner

WIRELESS RADIOS MANAGED BASED ON PROXIMITY

BACKGROUND

Portable electronic and computing devices, such as mobile phones, tablet computers, multimedia devices, and the like often include multiple, different systems for wireless communications, such as Wi-Fi, Bluetooth™, and Mobile Broadband. More recently, WiGig is a new wireless technology that is applicable to general consumer electronics and operates over the unlicensed 60 Ghz frequency band, which is different than other prior wireless communications systems. Because WiGig operates in the 60 Ghz frequency band, a new radio device, antenna, and radio chipset needs to be included as a radio system in consumer devices that implement the new wireless technology.

However, the addition of more hardware components in a mobile device that is battery-powered has power implications, both when the different radio systems of the wireless communications technologies are enabled for wireless communication and when scanning for an endpoint connection. For example, a user may configure his mobile device to automatically connect to a wireless dock when the device and endpoint come within communication range, and to automatically connect, the radio system of the mobile device continually or frequently scans for the endpoint to establish the communication link. This continual power draw on the battery decreases the amount of time that the mobile device can be used between battery charges.

SUMMARY

This Summary introduces features and concepts of wireless radios managed based on proximity, which is further described below in the Detailed Description and/or shown in the Figures. This Summary should not be considered to describe essential features of the claimed subject matter, nor used to determine or limit the scope of the claimed subject matter.

Wireless radios managed based on proximity is described. In embodiments, a mobile device, such as such as mobile phone, tablet computer, or other portable device can be implemented with multiple, different wireless communications systems, such as for Wi-Fi, Bluetooth™, Mobile Broadband, and WiGig. A mobile device can include a first radio system implemented for a first wireless communications technology, and a second radio system implemented for a second wireless communications technology. For example, the mobile device may be implemented with radio systems for both Wi-Fi and WiGig wireless communications, where the Wi-Fi radio system has a larger communication range than the WiGig radio system. A connection manager is implemented to determine, based on the first wireless communications technology (e.g., Wi-Fi), whether the mobile device is in an area that is proximate or includes an endpoint implemented for the second wireless communications technology (e.g., WiGig). The connection manager can turn-on the second radio system to enable wireless communication with the endpoint when the mobile device is in the area proximate the endpoint. Alternatively, the connection manager can turn-off the second radio system and conserve power that would otherwise be utilized by the second radio system to scan for the endpoint when the mobile device is not in the area proximate the endpoint.

The connection manager is implemented to generate a location signature of the area that is proximate or includes the endpoint implemented for the second wireless communications technology. The location signature can be generated based on the first radio system being within communication range of one or more stations of the first wireless communications technology, and at a time when the second radio system is communicatively-linked to the endpoint for wireless communication. For example, the location signature of a particular area can be generated when the WiGig radio system is communicatively-linked to the WiGig endpoint for wireless communication, and when the Wi-Fi radio system is within communication range of one or more Wi-Fi access points. The connection manager can generate the location signature to include a descriptor of the WiGig endpoint and identifiers of the one or more Wi-Fi access points that are within communication range of the Wi-Fi radio system of the mobile device. The connection manager can then determine whether the mobile device is in the area proximate the WiGig endpoint based on the location signature of the area.

BRIEF DESCRIPTION OF THE DRAWINGS

Embodiments of wireless radios managed based on proximity are described with reference to the following Figures. The same numbers may be used throughout to reference like features and components that are shown in the Figures.

DETAILED DESCRIPTION

Figure 1:
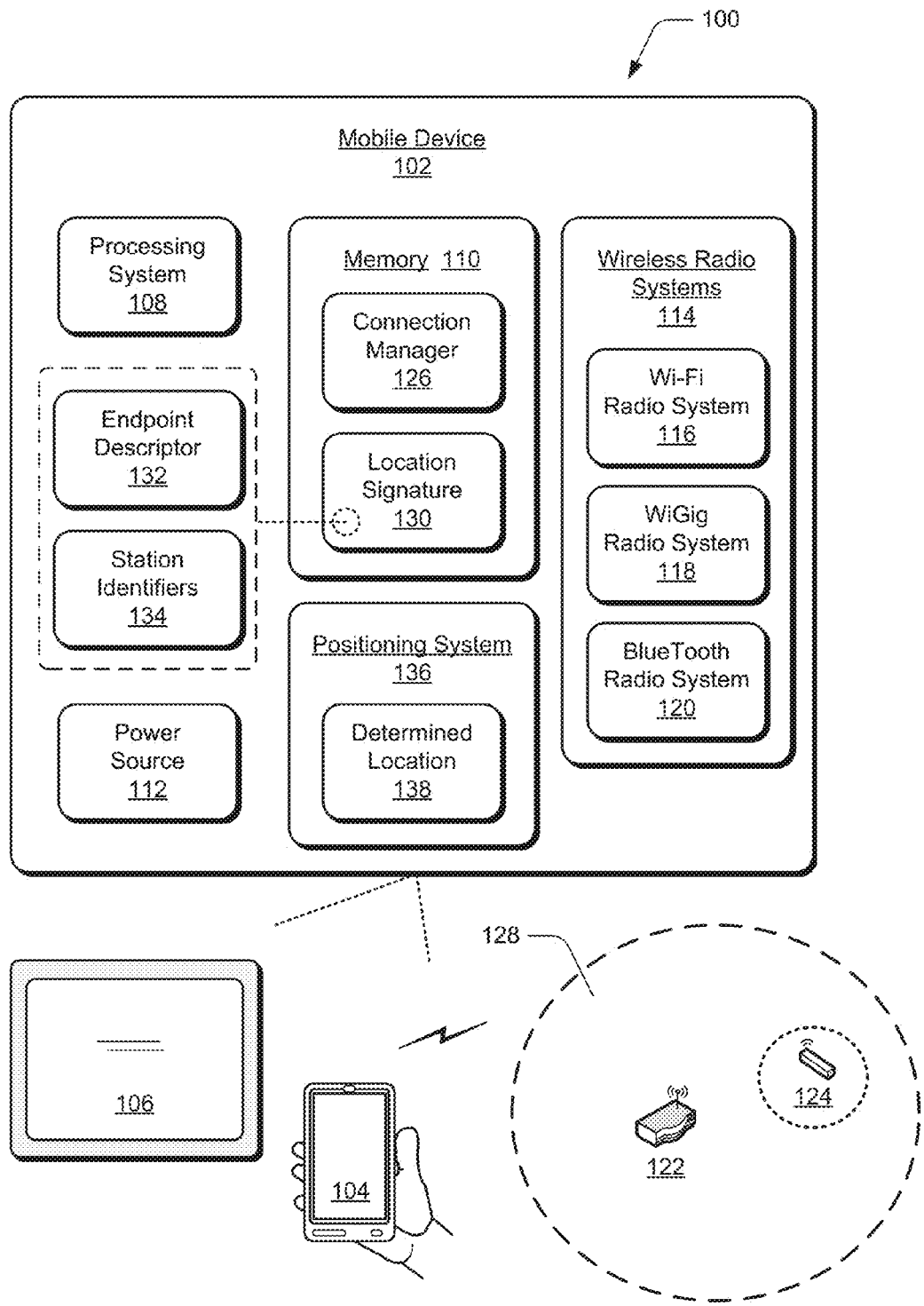
FIG. 1 illustrates an example system in which embodiments of wireless radios managed based on proximity can be implemented.

Embodiments of wireless radios managed based on proximity are described and can be implemented to conserve battery power in mobile devices that are battery powered and include more than one wireless communications technology for wireless communications. For example, a mobile device, such as a mobile phone, tablet computer, or other portable device can include radio devices, antennas, and chipsets of different radio systems for multiple, different wireless communications systems, such as for Wi-Fi, Bluetooth™, Mobile Broadband, and WiGig. A mobile device can be implemented to conserve the battery power that would otherwise be utilized by one of the radio systems to continually or frequently scan for an endpoint connection by keeping the radio system turned-off, and then selectively turning-on the radio system for wireless communication with the endpoint when the mobile device is in an area that is within range of the endpoint connection.

In embodiments, a connection manager of the mobile device is implemented to determine whether the mobile device is in an area that is proximate or includes an endpoint implemented for one of the wireless communications technologies based on another, different one of the wireless communications technologies. For example, a mobile device may be implemented with radio systems for both Wi-Fi and WiGig wireless communications, where the Wi-Fi radio system has a larger communication range than the WiGig radio system. The connection manager of the mobile device can conserve battery power by turning-off the WiGig radio system until the mobile device is in an area that is proximate a WiGig endpoint, and thus within WiGig wireless communication range. The connection manager can determine whether the mobile device is in the area proximate the WiGig endpoint based on a location signature for the particular area.

The connection manager can generate the location signature for the area when the WiGig radio system is communicatively-linked to the WiGig endpoint for wireless communication, and when the Wi-Fi radio system is within communication range of one or more Wi-Fi access points. The connection manager can generate the location signature to include a descriptor of the WiGig endpoint and identifiers of the one or more Wi-Fi access points that are within communication range of the Wi-Fi radio system of the mobile device. The connection manager can then determine whether the mobile device is in the area proximate the WiGig endpoint based on the location signature of the area. In this example, the WiGig endpoint (e.g., a wireless dock) can be discovered with minimal power draw from the battery, and the WiGig radio system can locate and connect to the WiGig endpoint as quickly as possible so that a user of the mobile device can immediately use the wireless dock without having to take any further manual action to connect the devices.

While features and concepts of wireless radios managed based on proximity can be implemented in any number of different devices, systems, networks, environments, and/or configurations, embodiments of wireless radios managed based on proximity are described in the context of the following example devices, systems, and methods.

FIG. 1 illustrates an example system 100 in which embodiments of wireless radios managed based on proximity can be implemented. The example system 100 includes a mobile device 102, such as a mobile phone 104, tablet computer 106, or any other computing, gaming, media playback, entertainment, and/or electronic media device that is implemented for wireless communication. The mobile device 102 can be implemented with various components, such as a processing system 108 and memory 110, a power source 112 (e.g., a battery) to power device components, and with any number and combination of different components as further described with reference to the example device shown in FIG. 6.

The mobile device 102 includes wireless radio systems 114 for multiple, different wireless communications systems, such as for Wi-Fi, Bluetooth™ Mobile Broadband, and WiGig. In this example, the mobile device 102 includes a Wi-Fi radio system 116, a WiGig radio system 118, and a Bluetooth™ radio system 120. Each of the different radio systems can include a radio device, antenna, and chipset that is implemented for a particular wireless communications technology. Generally, when activated or turned-on, the wireless radio systems 114 draw battery power of the mobile device 102 when scanning for a station or an endpoint connection, and when communicatively-linked for wireless communication. For example, the Wi-Fi radio system 116 is implemented to scan for Wi-Fi access points that are within communication range and communicatively-link to an access point 122 for wireless communication via Wi-Fi. Similarly, the WiGig radio system 118 is implemented to scan for a WiGig endpoint 124 (e.g., a WiGig docking device) that is within communication range and communicatively-link to the endpoint for wireless communication via WiGig.

The WiGig radio system is implemented based on the Wireless Gigabit Alliance, IEEE 802.11ad protocol for multi-gigabit speed wireless data communication over the unlicensed 60 GHz frequency band. The WiGig protocol provides high-performance wireless data communication of audio, video, and image data, and can be utilized to supplement the capabilities of wireless LAN communications at much faster speeds, while also maintaining compatibility with existing Wi-Fi devices. The WiGig 60 GHz frequency is a short-range wireless communication solution, generally implemented to communicatively-linked home entertainment and office computing devices within a short range of each other. Comparatively, other wireless communications technologies have a larger communication range than the WiGig radio system 118, such as the Wi-Fi radio system 116, as illustrated by the relatively larger communication range of the Wi-Fi access point 122 that encompasses the WiGig endpoint 124 communication range.

The mobile device 102 includes a connection manager 126 that can be implemented as a software application or module, such as executable software instructions (e.g., computer-executable instructions) that are executable with the processing system 108 of the mobile device to implement embodiments of wireless radios managed based on proximity. The connection manager 126 can be stored on computer-readable storage memory (e.g., the memory 110), such as any suitable memory device or electronic data storage implemented by the mobile device. In implementations, the connection manager 126 is a component of the device operating system, or can be implemented as part of a wireless technology specific service on the mobile device.

In embodiments, the connection manager 126 is implemented to conserve the battery power that would otherwise be utilized by one of the wireless radio systems 114 to continually or frequently scan for an endpoint connection by keeping the radio system turned-off, and then selectively turning-on the radio system for wireless communication with the endpoint when the mobile device 102 is in an area 128 that is within range of the endpoint connection. The connection manager 126 is implemented to determine whether the mobile device is in the area 128 that is proximate an endpoint implemented for one of the wireless communications technologies based on another, different one of the wireless communications technologies. For example, the mobile device 102 is implemented with radio systems for both Wi-Fi and WiGig wireless communications, where the Wi-Fi radio system 116 has a larger communication range than the WiGig radio system 118. The connection manager 126 can conserve battery power by turning-off the WiGig radio system 118 until the mobile device is in the area 128 that is proximate or includes the WiGig endpoint 124, and is thus within WiGig wireless communication range. The connection manager 126 can determine whether the mobile device 102 is in the area 128 proximate the WiGig endpoint 124 based on a location signature 130 for the particular area.

The connection manager 126 is implemented to generate the location signature 130 for the area 128 when the WiGig radio system 118 is communicatively-linked to the WiGig endpoint 124 for wireless communication, and when the Wi-Fi radio system 116 is within communication range of one or more Wi-Fi access points, such as the Wi-Fi access point 122. The connection manager 126 can generate the location signature 130 to include an endpoint descriptor 132 of the WiGig endpoint 124 and station identifiers 134 of one or more Wi-Fi access points that are within communication range of the Wi-Fi radio system 116 of the mobile device. Generally, the location signature 130 can be generated based on one or more access points around or nearby the mobile device. The connection manager 126 can then determine whether the mobile device 102 is in the area proximate the WiGig endpoint 124 based on the location signature 130 of the particular area. For example, the connection manager 126 can compare the one or more Wi-Fi access points that are in communication range of the Wi-Fi radio system 116 to the location signature 130 for the area to determine whether the mobile device 102 is in the particular area. In this example, the WiGig endpoint 124 (e.g., a wireless dock) can be discovered with minimal power draw from the battery (e.g., power source 112) of the device, and the WiGig radio system 118 can locate and connect to the WiGig endpoint 124 as quickly as possible so that a user of the mobile device can immediately use the wireless dock without having to take any further manual action to connect the devices.

The connection manager 126 may also be implemented to generate the location signature 130 for the area 128 based on another wireless communications technology, in addition to the Wi-Fi wireless radio system 116. For example, the location signature 130 can be generated based on the Bluetooth™ radio system 120 of the mobile device 102 being in communication range with one or more Bluetooth™ endpoints that are within the area 128 proximate the WiGig endpoint 124, and the location signature 130 includes the endpoint descriptor 132 of the WiGig endpoint 124, the station identifiers 134 of one or more Wi-Fi access points 122 that are within communication range of the Wi-Fi radio system 116, and/or identifiers of one or more Bluetooth™ endpoints that are within communication range of the Bluetooth™ radio system 120.

In other implementations, the mobile device 102 can include a positioning system 136, such as a Global Positioning System (GPS), and the connection manager 126 can generate the location signature 130 based in-part on a determined location 138 of the mobile device 102 in the area 128 that is proximate or includes the WiGig endpoint 124. It should be appreciated that a wireless communications technology and/or a positioning system that is used as a basis or in-part to generate the location signature 130 does not use more power than the wireless radio system that would otherwise be left turned-on to continually or frequently scan for an endpoint connection.

Figure 2:
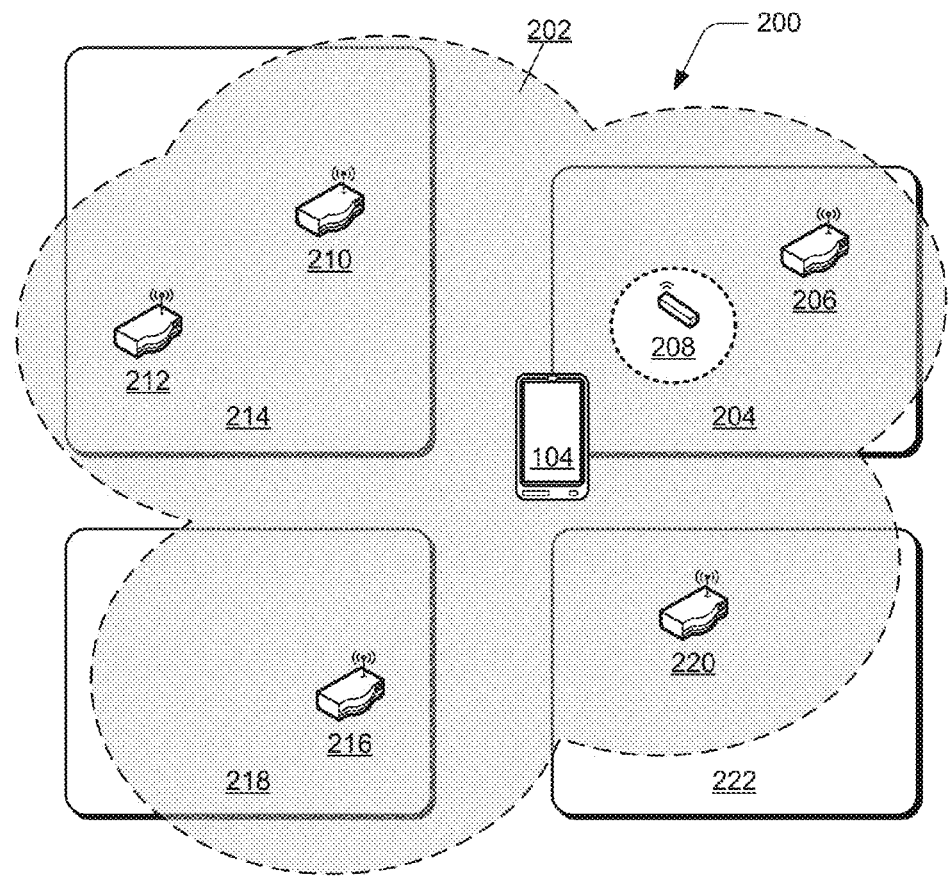
FIG. 2 illustrates an example of a wireless communication area that corresponds to a location signature as generated in accordance with one or more embodiments of wireless radios managed based on proximity.

FIG. 2 illustrates an example 200 of a wireless communication area 202 that corresponds to the location signature 130 described with reference to FIG. 1 in embodiments of wireless radios managed based on proximity. The example 200 illustrates that a user of the mobile phone 104 (e.g., an example of the mobile device 102) has a home 204 in which the user has both a Wi-Fi access point 206 and a WiGig endpoint 208 (e.g., a wireless dock). When the WiGig radio system 118 of the mobile phone 104 is communicatively-linked to the WiGig endpoint 208 for wireless communication, the connection manager 126 can generate the location signature 130 of the area 202, much like a unique "footprint" that defines the area encompassed by another wireless communications technology, which is Wi-Fi in this example. Generally, the location signature 130 can be generated based on one or more access points around or nearby the mobile phone.

The location signature 130 includes the endpoint descriptor 132 of the WiGig endpoint 208, and includes the station identifiers 134 of the Wi-Fi access points that are within communication range of the Wi-Fi radio system 116 of the mobile phone 104. In this example, the Wi-Fi access points that are within communication range include access points 210 and 212 in a nearby business 214, as well as an access point 216 in a nearby residence 218 and an access point 220 in another nearby residence 222. The location signature 130 can be based on all of the nearby Wi-Fi access points that are within communication range, or may be generated based on just one, or any combination, of the nearby access points. The area 202 that includes the WiGig endpoint 208 is uniquely defined by the location and/or identification of the Wi-Fi access points that are proximate the WiGig endpoint in the defined area. The connection manager 126 can then determine whether the mobile phone 104 is in the area 202 that is proximate the WiGig endpoint 208 based on the location signature 130 of the particular area.

Figure 3:
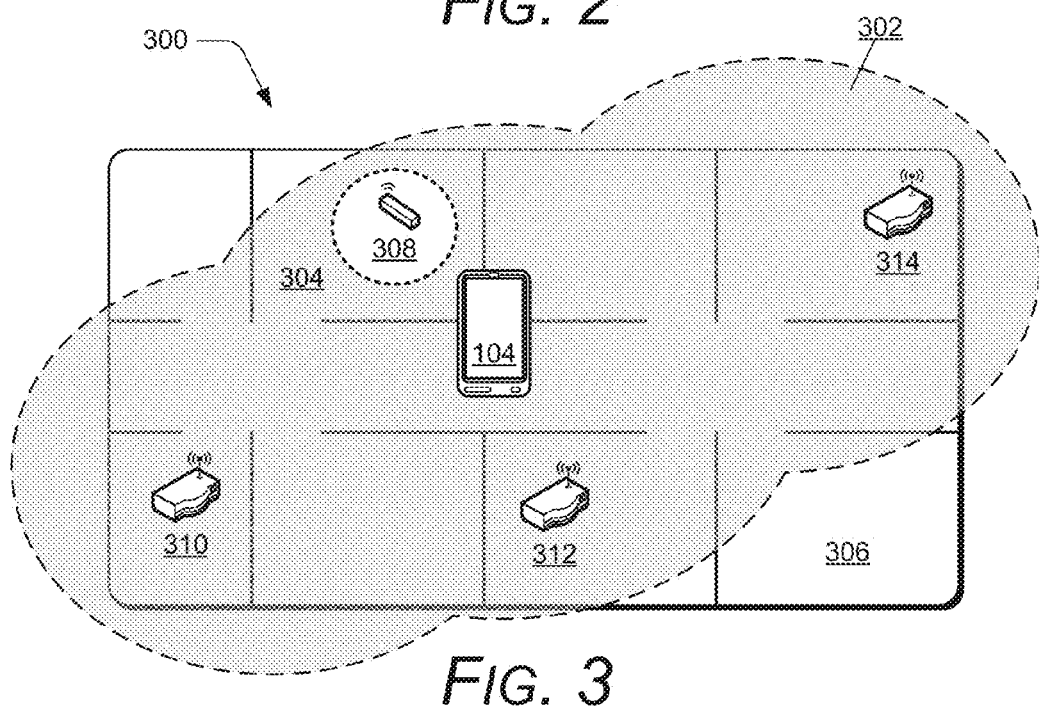
FIG. 3 illustrates another example of a wireless communication area that corresponds to a location signature as generated in accordance with one or more embodiments of wireless radios managed based on proximity.

FIG. 3 illustrates an example 300 of a wireless communication area 302 that corresponds to the location signature 130 described with reference to FIG. 1 in embodiments of wireless radios managed based on proximity. The example 300 further illustrates that the user of the mobile phone 104 (e.g., an example of the mobile device 102) has an office 304 in an office building 306, and the user has a WiGig endpoint 308 (e.g., a wireless dock) in his office. When the WiGig radio system 118 of the mobile phone 104 is communicatively-linked to the WiGig endpoint 308 for wireless communication, the connection manager 126 can generate the location signature 130 of the area 302 that uniquely defines the area encompassed by another wireless communications technology, which is Wi-Fi in this example.

The location signature 130 includes the endpoint descriptor 132 of the WiGig endpoint 308, and includes the station identifiers 134 of the Wi-Fi access points that are within communication range of the Wi-Fi radio system 116 of the mobile phone 104. In this example, the Wi-Fi access points that are within communication range include access points 310, 312, and 314 that are nearby in the office building 306. The location signature 130 can be based on all of the nearby Wi-Fi access points that are within communication range in the office building, or may be generated based on just one, or any combination, of the nearby access points. The area 302 that includes the WiGig endpoint 308 is uniquely defined by the location and/or identification of the Wi-Fi access points that are proximate the WiGig endpoint in the defined area. The connection manager 126 can then determine whether the mobile phone 104 is in the area 302 that is proximate the WiGig endpoint 308 based on the location signature 130 of the particular area.

Example methods 400 and 500 are described with reference to respective FIGS. 4 and 5 in accordance with one or more embodiments of wireless radios managed based on proximity. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
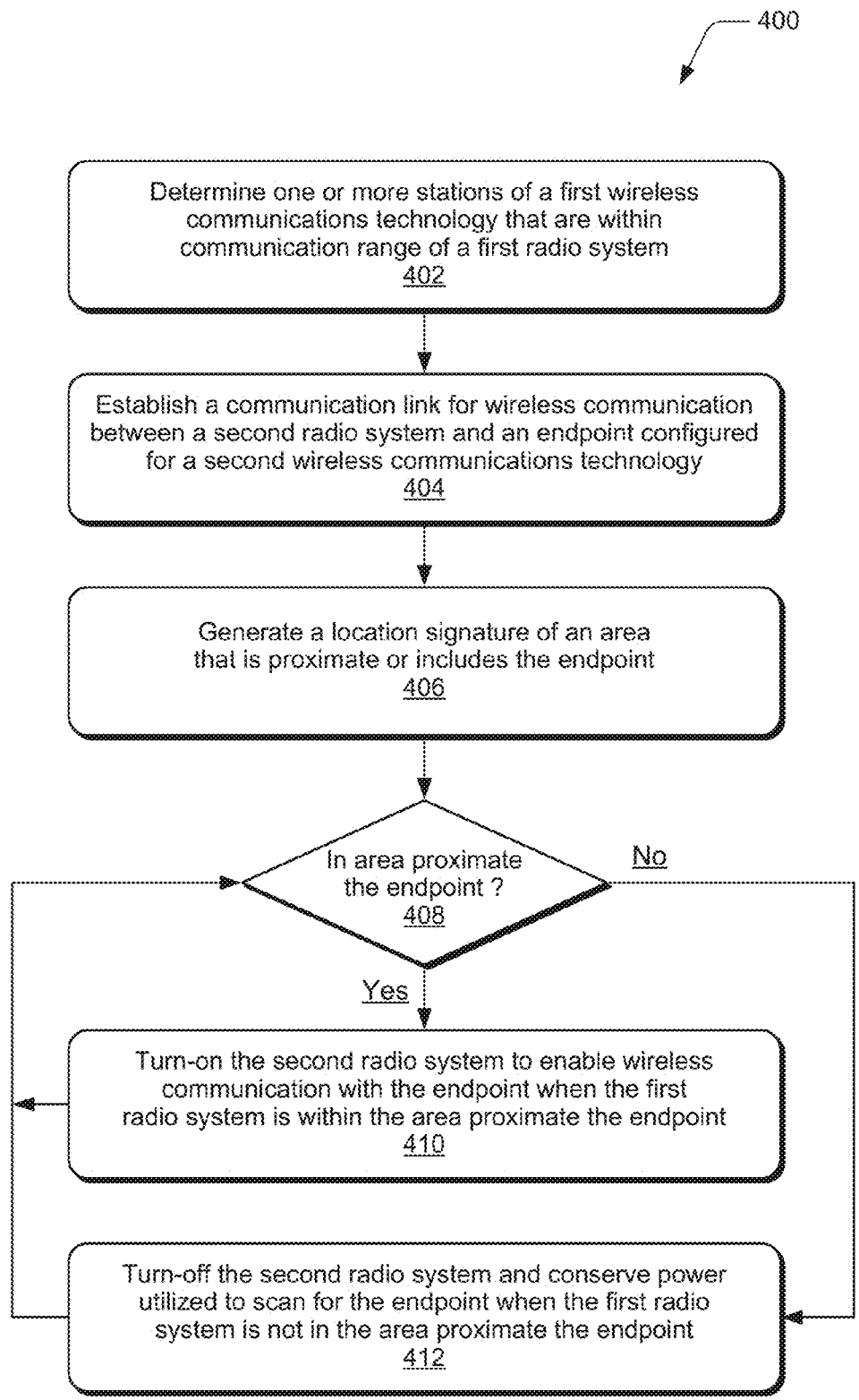
FIG. 4 illustrates example method(s) of wireless radios managed based on proximity in accordance with one or more embodiments.

FIG. 4 illustrates example method(s) 400 of wireless radios managed based on proximity, and is generally described with reference to the example system shown in FIG. 1. The order in which the method is described is not intended to be construed as a limitation, and any number or combination of the method operations can be performed in any order to implement a method, or an alternate method.

At 402, one or more stations of a first wireless communications technology that are within communication range of a first radio system are determined. For example, the mobile device 102 (FIG. 1) includes the Wi-Fi radio system 116 that determines one or more stations, such as the Wi-Fi access point 122, that are within communication range. Similarly, the mobile phone 104 (FIG. 2) includes the Wi-Fi radio system 116 that determines the Wi-Fi access point 206 in the home 204, as well as other stations that are within communication range, such as the Wi-Fi access points 210 and 212 in the business 214 that is nearby the home, and the access points 216 and 220 in the nearby residences 218 and 222, respectively. In another example, the mobile phone 104 (FIG. 3) includes the Wi-Fi radio system 116 that determines the Wi-Fi access points 310, 312, and 314 that are nearby the office 304 in the office building 306.

At 404, a communication link is established for wireless communication between a second radio system and an endpoint configured for a second wireless communications technology. For example, the mobile device 102 (FIG. 1) includes the WiGig radio system 118 that establishes a communication link with the WiGig endpoint 124 for WiGig wireless communication. Similarly, the mobile phone 104 (FIG. 2) includes the WiGig radio system 118 that establishes a communication link with the WiGig endpoint 208 in the home 204 for WiGig wireless communication. In another example, the mobile phone 104 (FIG. 3) includes the WiGig radio system 118 that establishes a communication link with the WiGig endpoint 308 in the office 304 for WiGig wireless communication.

At 406, a location signature of an area that is proximate or includes the endpoint is generated. For example, the connection manager 126 that is implemented by the mobile device 102 generates the location signature 130 of the area 128 that is proximate or includes the WiGig endpoint 124. The location signature 130 includes the endpoint descriptor 132 of the WiGig endpoint 124 and station identifiers 134 of one or more stations (e.g., the Wi-Fi access point 122) that are within communication range of the Wi-Fi radio system 116 in the mobile device. Additionally, the location signature 130 can be generated by the connection manager 126 based on a third radio system of a third wireless communications technology being in communication range with one or more endpoints configured for the third wireless communications technology. For example, in addition to the Wi-Fi radio system 116, the location signature 130 may be generated based on the Bluetooth™ radio system 120 of the mobile device 102 being in communication range with one or more Bluetooth™ endpoints that are within the area 128 that is proximate or includes the WiGig endpoint 124.

At 408, a determination is made as to whether the first radio system is in the area proximate the endpoint based on the location signature. For example, the connection manager 126 determines whether the Wi-Fi radio system 116 of the mobile device 102 is in the area 128 that is proximate or includes the WiGig endpoint 124 based on the location signature 130 of the particular area. The connection manager 126 can compare the one or more Wi-Fi access points that are in communication range of the Wi-Fi radio system 116 to the location signature 130 for the area to determine whether the mobile device 102 is in the particular area.

If the first radio system of the mobile device is in the area proximate the endpoint based on the location signature (i.e., "Yes" from 408), then at 410, the second radio system is turned-on to enable wireless communication with the endpoint. For example, the connection manager 126 turns-on the WiGig radio system 118 if the Wi-Fi radio system 116 of the mobile device is in the area 128 that is proximate or includes the WiGig endpoint 124. In this example, the WiGig endpoint 124 (e.g., a wireless dock) can be discovered with minimal power draw from the battery (e.g., power source 112) of the device, and the WiGig radio system 118 can locate and connect to the WiGig endpoint 124 as quickly as possible so that a user of the mobile device can immediately use the wireless dock.

If the first radio system of the mobile device is not in the area proximate the endpoint based on the location signature (i.e., "No" from 408), then at 412, the second radio system is turned-off to conserve power that would otherwise be utilized to scan for the endpoint. For example, the connection manager 126 turns-off the WiGig radio system 118 of the mobile device if the Wi-Fi radio system 116 is not in the area 128 that is proximate the WiGig endpoint 124 to conserve power that the WiGig radio system 118 would utilize to scan for the endpoint.

Figure 5:
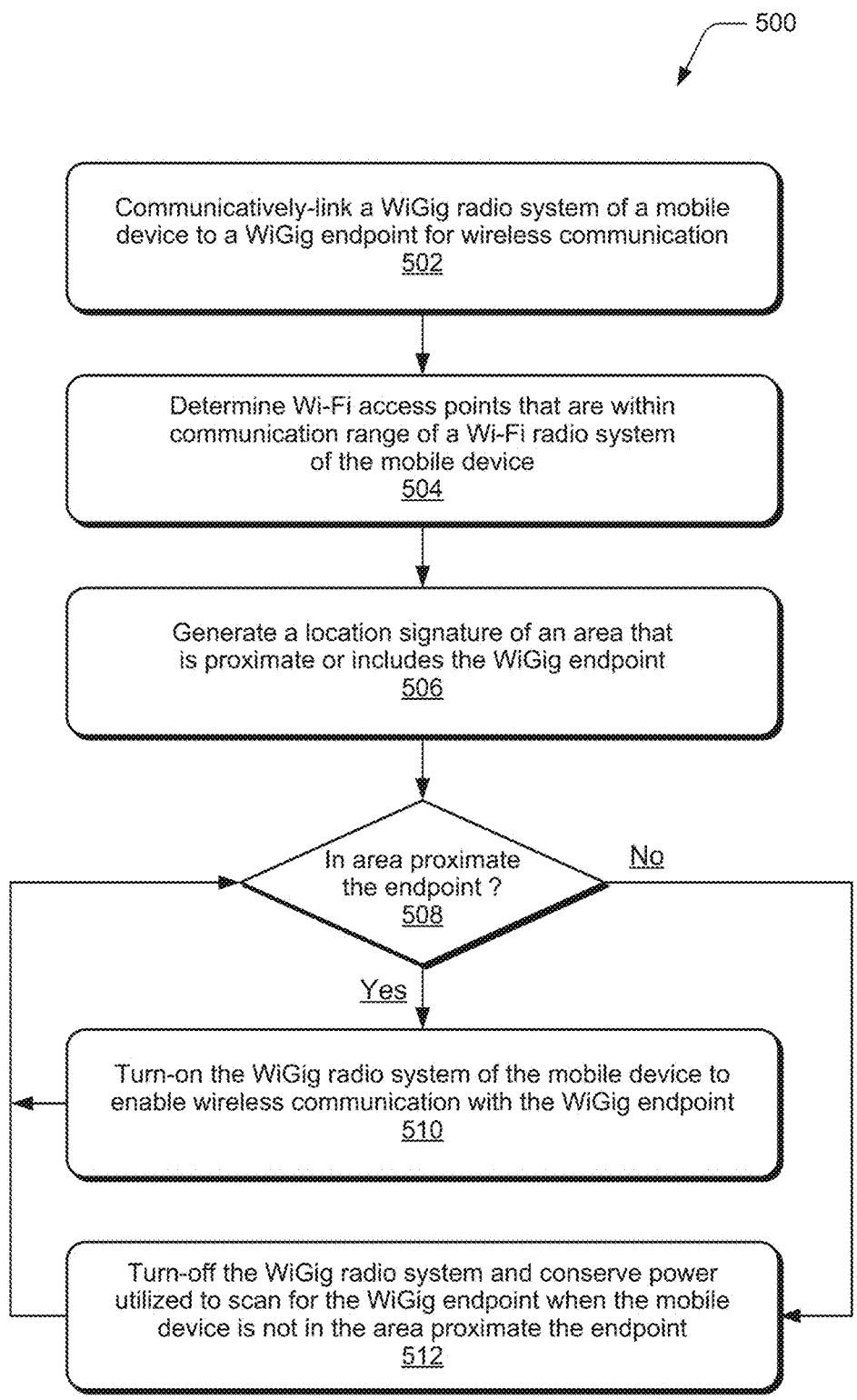
FIG. 5 illustrates example method(s) of wireless radios managed based on proximity in accordance with one or more embodiments.

FIG. 5 illustrates example method(s) 500 of wireless radios managed based on proximity, and is generally described with reference to the example system shown in FIG. 1. The order in which the method is described is not intended to be construed as a limitation, and any number or combination of the method operations can be performed in any order to implement a method, or an alternate method.

At 502, a WiGig radio system of a mobile device is communicatively-linked to a WiGig endpoint for wireless communication. For example, the mobile phone 104 (FIG. 2) is an example of the mobile device 102 (FIG. 1) that includes the WiGig radio system 118, which establishes a communication link with the WiGig endpoint 208 in the home 204 for WiGig wireless communication. Similarly, the mobile phone 104 (FIG. 3) includes the WiGig radio system 118 that establishes a communication link with the WiGig endpoint 308 in the office 304 of the office building 306 for WiGig wireless communication.

At 504, Wi-Fi access points that are within communication range of a Wi-Fi radio system of the mobile device are determined. For example, the mobile phone 104 (FIG. 2) includes the Wi-Fi radio system 116 that determines the Wi-Fi access point 206 in the home 204, as well as other stations that are within communication range, such as the Wi-Fi access points 210 and 212 in the business 214 that is nearby the home, and the access points 216 and 220 in the nearby residences 218 and 222, respectively. Similarly, the mobile phone 104 (FIG. 3) includes the Wi-Fi radio system 116 that determines the Wi-Fi access points 310, 312, and 314 that are nearby the office 304 in the office building 306.

At 506, a location signature of an area that is proximate or includes the WiGig endpoint is generated. For example, the connection manager 126 that is implemented by the mobile phone 104 generates the location signature 130 of the area 202 (FIG. 2) that is proximate or includes the WiGig endpoint 208 in the home 204. The location signature 130 includes the endpoint descriptor 132 of the WiGig endpoint 208 and station identifiers 134 of the Wi-Fi access points that are within communication range of the Wi-Fi radio system 116 of the mobile phone. The location signature 130 can be based on all of the nearby Wi-Fi access points that are within communication range, or may be generated based on just one, or any combination, of the nearby access points. In another example, the connection manager 126 generates the location signature 130 of the area 302 (FIG. 3) that is proximate or includes the WiGig endpoint 308 in the office building 306. The location signature 130 includes the endpoint descriptor 132 of the WiGig endpoint 308 and station identifiers 134 of the Wi-Fi access points that are within communication range of the Wi-Fi radio system 116 in the mobile phone.

Alternatively or in addition, the connection manager 126 generates the location signature 130 based on the mobile phone 104 being in communication range with one or more Bluetooth™ endpoints that are in an area proximate the WiGig endpoint, and the location signature additionally includes station identifiers of the one or more Bluetooth™ endpoints. Alternatively or in addition, the location signature 130 is generated based on a positioning system that determines a location of the mobile device 104 in the area that is proximate the WiGig endpoint, and the location signature includes the location as determined from the positioning system. In embodiments, the location signature 130 can be generated to include any combination of the various wireless communication technology endpoints and the determined location in the area that is proximate or includes the WiGig endpoint.

At 508, a determination is made as to whether the mobile device is in the area proximate the WiGig endpoint based on the location signature. For example, the connection manager 126 determines whether the Wi-Fi radio system 116 of the mobile phone 104 is in the area 202 that is proximate or includes the WiGig endpoint 208 based on the location signature 130 of the particular area. The connection manager 126 can compare the Wi-Fi access points from the nearby business and residences that are in communication range of the Wi-Fi radio system 116 to the location signature 130 for the area 202 to determine whether the mobile phone 104 is in the particular area. Similarly, the connection manager 126 determines whether the Wi-Fi radio system 116 of the mobile phone 104 is in the area 302 that is proximate or includes the WiGig endpoint 308 based on the location signature 130 of the particular area. The connection manager 126 can compare the Wi-Fi access points from within the office building 306 that are in communication range of the Wi-Fi radio system 116 to the location signature 130 for the area 302 to determine whether the mobile phone 104 is in the particular area.

If the mobile device is in the area proximate the WiGig endpoint based on the location signature (i.e., "Yes" from 508), then at 510, the WiGig radio system of the mobile device is turned-on to enable wireless communication with the WiGig endpoint. For example, the connection manager 126 turns-on the WiGig radio system 118 of the mobile phone 104 if the Wi-Fi radio system 116 of the mobile phone is in the area 202 that is proximate the WiGig endpoint 208 in the home 204, which initiates the WiGig radio system 118 locating and communicatively-linking to the WiGig endpoint 208. Similarly, the connection manager 126 turns-on the WiGig radio system 118 of the mobile phone 104 if the Wi-Fi radio system 116 of the mobile phone is in the area 302 that is proximate the WiGig endpoint 308 in the office building 306.

If the mobile device is not in the area proximate the WiGig endpoint based on the location signature (i.e., "No" from 508), then at 512, the WiGig radio system is turned-off to conserve power that would otherwise be utilized to scan for the WiGig endpoint. For example, the connection manager 126 turns-off the WiGig radio system 118 of the mobile phone 104 if the Wi-Fi radio system 116 is not in the area 202 that is proximate the WiGig endpoint 208 to conserve power that would otherwise be utilized to scan for the endpoint. Similarly, the connection manager 126 turns-off the WiGig radio system 118 of the mobile phone 104 if the Wi-Fi radio system 116 is not in the area 302 that is proximate the WiGig endpoint 308 to conserve power that would otherwise be utilized to scan for the endpoint.

Figure 6:
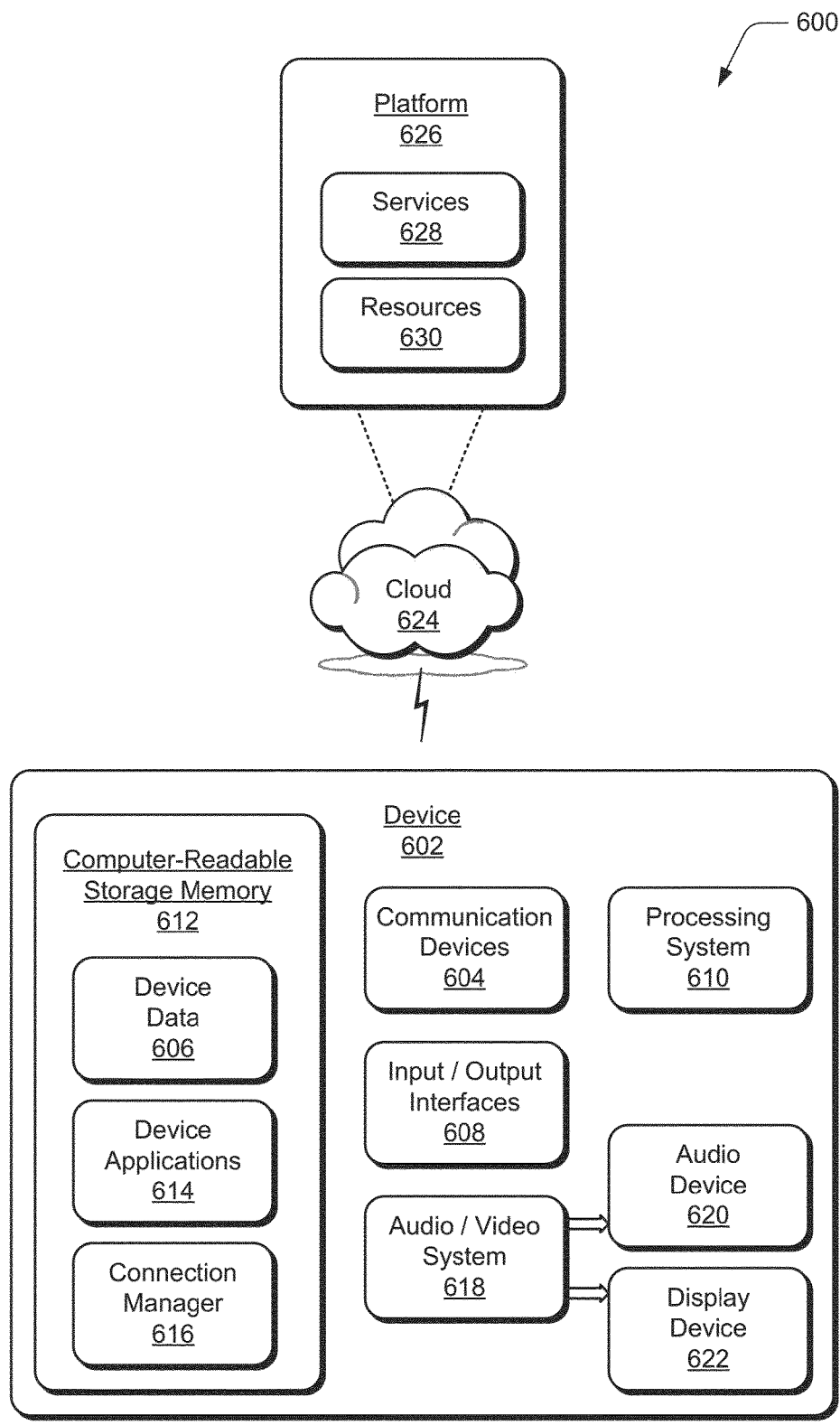
FIG. 6 illustrates an example system with an example device that can implement embodiments of wireless radios managed based on proximity.

FIG. 6 illustrates an example system 600 that includes an example device 602, which can implement embodiments of wireless radios managed based on proximity. The example device 602 can be implemented as any of the computing devices described with reference to the previous FIGS. 1-5, such as any type of client device, mobile phone, tablet, computing, communication, entertainment, gaming, media playback, and/or other type of device. For example, the mobile device 102 and/or the mobile phone 104 shown in FIG. 1 may be implemented as the example device 602.

The device 602 includes communication devices 604 that enable wired and/or wireless communication of device data 606, such as location signature data, positioning system data, and/or wireless radio systems data. Additionally, the device data can include any type of audio, video, and/or image data. The communication devices 604 can also include transceivers for cellular phone communication and for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes a computer-readable storage memory 612, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 612 provides storage of the device data 606 and various device applications 614, such as an operating system that is maintained as a software application with the computer-readable storage memory and executed by the processing system 610. In this example, the device applications include a connection manager 616 that implements embodiments of wireless radios managed based on proximity, such as when the example device 602 is implemented as the mobile device 102, the mobile phone 104, or the tablet computer 106 shown in FIG. 1. An example of the connection manager 616 is the connection manager 126 that is implemented by 10 the mobile device 102, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In embodiments, at least part of the techniques described for wireless radios managed based on proximity may be implemented in a distributed system, such as over a "cloud" 624 in a platform 626. The cloud 624 includes and/or is representative of the platform 626 for services 628 and/or resources 630. The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of wireless radios managed based on proximity have been described in language specific to features and/or methods, the appended claims are not necessarily limited to the specific features or methods described. Rather, the specific features and methods are disclosed as example implementations of wireless radios managed based on proximity, and other equivalent features and methods are intended to be within the scope of the appended claims. Further, various different embodiments are described and it is to be appreciated that each described embodiment can be implemented independently or in connection with one or more other described embodiments.

Additional aspects of the techniques, features, and/or methods discussed herein relate to one or more of the following embodiments.

A method implemented in a mobile device comprises communicating via Wi-Fi with a first radio system of the mobile device, where the first radio system is configured for wireless communication with Wi-Fi access points; generating a location signature of an area that is proximate a WiGig endpoint, where the location signature is based on the first radio system of the mobile device being within communication range of one or more of the Wi-Fi access points; determining whether the mobile device is in the area proximate the WiGig endpoint based on the location signature; and turning-on a second radio system of the mobile device to enable wireless communication via WiGig with the WiGig endpoint.

Alternatively or in addition to the above described method, any one or combination of: said generating the location signature at a time when the second radio system is communicatively-linked to the WiGig endpoint for wireless communication; the location signature comprises a descriptor of the WiGig endpoint and identifiers of the one or more Wi-Fi access points; said turning-on the second radio system initiates locating and communicatively-linking to the WiGig endpoint that is in the area proximate the mobile device; turning-off the second radio system and conserving power that would otherwise be utilized by the second radio system to scan for the WiGig endpoint when the mobile device is not in the area proximate the endpoint; said determining whether the mobile device is in the area proximate the WiGig endpoint is further based on a third radio system of the mobile device being in communication range with one or more Bluetooth™ endpoints that are in the area proximate the WiGig endpoint.

A mobile device comprises a first radio system configured for a first wireless communications technology; a second radio system configured for a second wireless communications technology, where the first wireless communications technology has a larger communication range than the second wireless communications technology; a processing system to implement a connection manager that is executable and configured to determine, based on the first wireless communications technology, whether the mobile device is in an area that is proximate an endpoint implemented for the second wireless communications technology; and turn-on the second radio system to enable wireless communication with the endpoint if the mobile device is in the area proximate the endpoint.

Alternatively or in addition to the above described mobile device, any one or combination of: the connection manager is configured to generate a location signature of the area that is proximate the endpoint implemented for the second wireless communications technology, where the location signature based on the first radio system is within communication range of one or more stations of the first wireless communications technology, and said determine whether the mobile device is in the area proximate the endpoint based on the location signature; the connection manager is configured to generate the location signature at a time when the second radio system is communicatively-linked to the endpoint for the wireless communication; the location signature comprises a descriptor of the endpoint and identifiers of the one or more stations of the first wireless communications technology; the connection manager is configured to said turn-on the second radio system that locates and communicatively-links to the endpoint that is in the area proximate the mobile device; the connection manager is configured to turn-off the second radio system and conserve power that would otherwise be utilized by the second radio system to scan for the endpoint if the mobile device is not in the area proximate the endpoint; the first wireless communications technology is Wi-Fi, the second wireless communications technology is WiGig, and the endpoint is implemented as a WiGig endpoint; the connection manager is configured to generate a location signature of the area that is proximate the WiGig endpoint, where the location signature is based on the first radio system being within communication range of one or more Wi-Fi access points, and said determine whether the mobile device is in the area proximate the WiGig endpoint based on the location signature; and the connection manager is further configured to said determine whether the mobile device is in the area proximate the endpoint based on an additional wireless communications technology.

A method implemented in a mobile device comprises determining one or more stations of a first wireless communications technology that are within communication range of a first radio system; establishing a communication link for wireless communication between a second radio system and an endpoint configured for a second wireless communications technology; generating a location signature of an area that is proximate or includes the endpoint, where the location signature comprises a descriptor of the endpoint and identifiers of the one or more stations that are within communication range of the first radio system; and turning-off the second radio system and conserving power that would otherwise be utilized by the second radio system to scan for the endpoint when the first radio system is not in the area proximate the endpoint; or turning-on the second radio system to enable the wireless communication with the endpoint when the first radio system is in the area proximate the endpoint.

Alternatively or in addition to the above described method, any one or combination of: determining whether the second radio system is in the area that is proximate or includes the endpoint based on the location signature and whether the one or more stations of the first wireless communications technology are within the communication range of the first radio system, and one of said turning-off or turning-on the second radio system; the first wireless communications technology is Wi-Fi, the second wireless communications technology is WiGig, and the endpoint is implemented as a WiGig endpoint; said generating the location signature of the area that is proximate or includes the endpoint is based on the first radio system being within the communication range of one or more Wi-Fi access points; and said generating the location signature of the area that is proximate or includes the endpoint is further based on an additional wireless communications technology.

The invention claimed is:

1. A method, comprising:
communicating via Wi-Fi with a first radio system of a mobile device, the first radio system configured for wireless communication with Wi-Fi access points;
generating a location signature of an area that is proximate a WiGig endpoint, the location signature based on the first radio system of the mobile device being within communication range of one or more of the Wi-Fi access points;
determining whether the mobile device is in the area proximate the WiGig endpoint based on the location signature;
turning-on a second radio system of the mobile device to enable wireless communication via WiGig with the WiGig endpoint if the mobile device is in the area proximate the WiGig endpoint, the second radio system operating at a lower power than the first radio system; and
turning-off the second radio system and conserving power that would otherwise be utilized by the second radio system to scan for the WiGig endpoint if the mobile device is not in the area proximate the endpoint.

2. The method as recited in claim 1, wherein said generating the location signature occurs at a time when the second radio system is communicatively-linked to the WiGig endpoint for wireless communication.

3. The method as recited in claim 1, wherein the location signature comprises a descriptor of the WiGig endpoint and identifiers of the one or more Wi-Fi access points.

4. The method as recited in claim 1, wherein said turning-on the second radio system initiates locating and communicatively-linking to the WiGig endpoint that is in the area proximate the mobile device.

5. The method as recited in claim 1, wherein said determining whether the mobile device is in the area proximate the WiGig endpoint is further based on a third radio system of the mobile device being in communication range with one or more Bluetooth™ endpoints that are in the area proximate the WiGig endpoint.

6. A mobile device, comprising:
a first radio system configured for a first wireless communications technology;
a second radio system configured for a second wireless communications technology, the first wireless communications technology having a larger communication range than the second wireless communications technology;
a processing system to implement a connection manager that is executable and configured to:
determine, based on the first wireless communications technology, whether the mobile device is in an area that is proximate an endpoint implemented for the second wireless communications technology;
turn-on the second radio system to enable wireless communication with the endpoint if the mobile device is in the area proximate the endpoint; and
turn-off the second radio system and conserve power that would otherwise be utilized by the second radio system to scan for the endpoint if the mobile device is not in the area proximate the endpoint.

7. The mobile device as recited in claim 6, wherein the connection manager is configured to:
generate a location signature of the area that is proximate the endpoint implemented for the second wireless communications technology, the location signature based on the first radio system being within communication range of one or more stations of the first wireless communications technology; and
said determine whether the mobile device is in the area proximate the endpoint based on the location signature.

8. The mobile device as recited in claim 7, wherein the connection manager is configured to generate the location signature at a time when the second radio system is communicatively-linked to the endpoint for the wireless communication.

9. The mobile device as recited in claim 7, wherein the location signature comprises a descriptor of the endpoint and identifiers of the one or more stations of the first wireless communications technology.

10. The mobile device as recited in claim 6, wherein the connection manager is configured to said turn-on the second radio system that locates and communicatively-links to the endpoint that is in the area proximate the mobile device.

11. The mobile device as recited in claim 6, wherein:
the first wireless communications technology is Wi-Fi;
the second wireless communications technology is WiGig; and
the endpoint is implemented as a WiGig endpoint.

12. The mobile device as recited in claim 11, wherein the connection manager is configured to:
generate a location signature of the area that is proximate the WiGig endpoint, the location signature based on the first radio system being within communication range of one or more Wi-Fi access points; and
said determine whether the mobile device is in the area proximate the WiGig endpoint based on the location signature.

13. The mobile device as recited in claim 6, wherein the connection manager is further configured to said determine whether the mobile device is in the area proximate the endpoint based on an additional wireless communications technology.

14. A method, comprising:
determining one or more stations of a first wireless communications technology that are within communication range of a first radio system;
establishing a communication link for wireless communication between a second radio system and an endpoint configured for a second wireless communications technology, the second radio system operating at a lower power than the first radio system;
generating a location signature of an area that is proximate or includes the endpoint, the location signature comprising a descriptor of the endpoint and identifiers of the one or more stations that are within communication range of the first radio system; and
turning-off the second radio system and conserving power that would otherwise be utilized by the second radio system to scan for the endpoint when the first radio system is not in the area proximate the endpoint; or
turning-on the second radio system to enable the wireless communication with the endpoint when the first radio system is in the area proximate the endpoint.

15. The method as recited in claim 14, further comprising:
determining whether the second radio system is in the area that is proximate or includes the endpoint based on the location signature and whether the one or more stations of the first wireless communications technology are within the communication range of the first radio system; and
one of said turning-off or turning-on the second radio system.

16. The method as recited in claim 14, wherein:
the first wireless communications technology is Wi-Fi;
the second wireless communications technology is WiGig; and
the endpoint is implemented as a WiGig endpoint.

17. The method as recited in claim 16, wherein said generating the location signature of the area that is proximate or includes the endpoint is based on the first radio system being within the communication range of one or more Wi-Fi access points.

18. The method as recited in claim 14, wherein said generating the location signature of the area that is proximate or includes the endpoint is further based on an additional wireless communications technology.

19. The method as recited in claim 14, wherein the generating the location signature is performed during the second radio system being communicatively-linked to the endpoint for the wireless communication.

20. The method as recited in claim 14, wherein the location signature comprises a descriptor of a WiGig endpoint and identifiers of the one or more Wi-Fi access points.

* * * * *